(12) United States Patent
Nelson

(10) Patent No.: US 7,846,330 B2
(45) Date of Patent: Dec. 7, 2010

(54) OIL FILTER DRAIN TOOL

(76) Inventor: Keith A. Nelson, P.O. Box 3377, Hailey, ID (US) 83333

(*) Notice: Subject to any disclaimer, the term of this patent is extended or adjusted under 35 U.S.C. 154(b) by 70 days.

(21) Appl. No.: 12/051,730

(22) Filed: Mar. 19, 2008

(65) Prior Publication Data

US 2008/0230493 A1     Sep. 25, 2008

Related U.S. Application Data

(60) Provisional application No. 60/895,666, filed on Mar. 19, 2007, now abandoned.

(51) Int. Cl.
*B26F 1/32* (2006.01)
(52) U.S. Cl. .................. 210/233; 210/248; 222/81; 83/660; 137/317; 137/318
(58) Field of Classification Search .............. 30/400, 30/1, 2; 83/30, 660; 81/3.48, 3.49; 16/110.1, 16/422; 137/317, 318; 210/233, 248; 222/81
See application file for complete search history.

(56) References Cited

U.S. PATENT DOCUMENTS

| | | | | |
|---|---|---|---|---|
| 2,051,931 A | * | 8/1936 | Errett et al. | 211/85.25 |
| 2,071,944 A | * | 2/1937 | Hoffman | 222/88 |
| 2,587,779 A | * | 3/1952 | Smith | 141/106 |
| 2,728,488 A | * | 12/1955 | Hankins | 141/106 |
| 2,781,065 A | * | 2/1957 | Hofacer | 141/106 |
| 2,807,290 A | * | 9/1957 | Hearn | 141/375 |
| 5,299,714 A | | 4/1994 | Kilgore | |
| 5,522,437 A | * | 6/1996 | Blackburn | 141/106 |
| 5,546,979 A | | 8/1996 | Clark, II et al. | |
| 5,558,140 A | | 9/1996 | Clark, II | |
| 5,598,951 A | | 2/1997 | DeBano, Jr. | |
| 5,667,699 A | | 9/1997 | Schlise | |
| 5,694,990 A | * | 12/1997 | Crima | 141/330 |
| 6,056,874 A | | 5/2000 | Goodman | |

* cited by examiner

*Primary Examiner*—Duane Smith
*Assistant Examiner*—Paul J Durand
(74) *Attorney, Agent, or Firm*—Robert L. Shaver; Dykas & Shaver LLP

(57) ABSTRACT

The invention is a handheld device for puncturing oil filters and thus allowing more retained oil to drain from used filters. An oil filter has several internal chambers filled with oil which do not drain by gravity from the filter unless the sidewall of the filter is punches. The device of the invention punches the sidewall of the filters, and provides a rack for draining the oil filters.

9 Claims, 3 Drawing Sheets

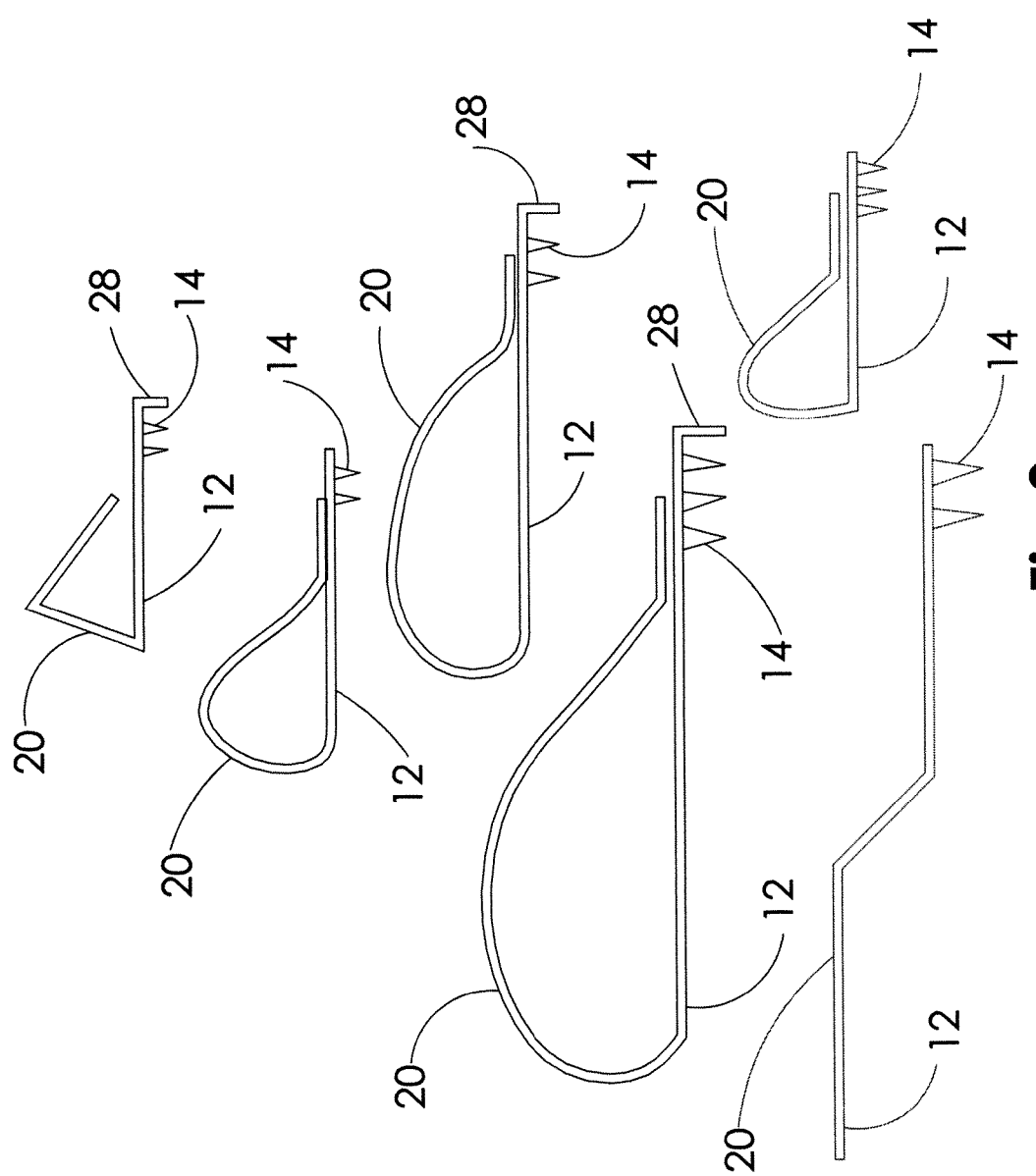

OIL FILTER DRAIN TOOL

CROSS-REFERENCE TO RELATED APPLICATIONS

This application claims the priority date of the provisional application entitled OIL FILTER DRAIN TOOL filed by Keith A. Nelson with application Ser. No. 60/895,666, filed Mar. 19, 2007 which was pending when this application was filed, now abandoned.

FIELD OF THE INVENTION

The invention generally relates to a device for draining oil from oil filters and more particularly to a device which drains oil from oil filters by puncturing the sides of automotive oil filters.

BACKGROUND OF THE INVENTION

Automotive oil filters are structures which are screwed onto the side of an engine and provide filtration of particulate matter from the oil systems of engines. The typical automotive oil filter is a cylindrical object and can be of various diameters depending on the specifications of the engine. One end is closed and in a generally dome shaped configuration. The other end of the oil filter has a threaded hole which is spun onto a threaded post on the engine. Around the threaded hole are oil passages, and a gasket which seals the oil filter to the engine mount. When an oil filter is changed it is merely spun off of the threaded post, and is typically placed upside down and allowed to drain. A certain amount of oil drains through the oil passages on the bottom of the oil filter, but there are chambers within the oil filter which do not flow by gravity out the oil passages. There may be a convoluted route for the oil to travel before it can exit out the oil passages, or there may be check valves which prevent the oil from flowing out the passages. In any event, there are chambers within the oil filter which are not drained by gravity, and which retain a considerable amount of oil within the oil filter.

Thus, what is needed is a device which will allow more oil from an automotive oil filter to be drained in a simple and efficient manner.

SUMMARY OF THE INVENTION

For these reasons, it is an object of the invention to more easily and completely drain residual oil from an automotive oil filter. It is the object of the device of the invention to easily and effectively allow residual oil from an oil filter to be drained from the body of the oil filter. This is accomplished by a device body which has at least two projecting spikes. Other versions of the device may have three or more projecting spikes. The device body is generally flat and linear, with a handle at one end and the projecting spikes at another end. The handle is configured so that it extends beyond the dome top of the oil filter, and makes it easy for the user to hold so that the spikes and the lower part of the device are held against the side of the oil filter. The bottom spike is placed fairly close to the bottom edge of the oil filter. When held in this position, the device body can be struck with an object such as a hammer, or even with the heel of the user's hand, and the projecting spikes forced through the thin wall of the oil filter to perforate them. The spikes can be configured in a number of shapes such as conical, or nail like, with a sharpened end. The spikes can be a number of different diameters such as the diameter of a sturdy thumb tack, or the diameter of a wide range of nail sizes, or they can be generally conical shaped such as spikes for track shoes or golf shoes. The spikes can also be generally chisel shaped or flat, star shaped or pyramidal. All of these possible shapes of spikes have the general characteristics of having a sharp end and being able to penetrate the metal side of the oil filter.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

BRIEF DESCRIPTION OF THE DRAWINGS

FIG. 3 is a front view of a number of different configurations of the draining tool of the invention.

DESCRIPTION OF THE PREFERRED EMBODIMENTS

Figure 1:
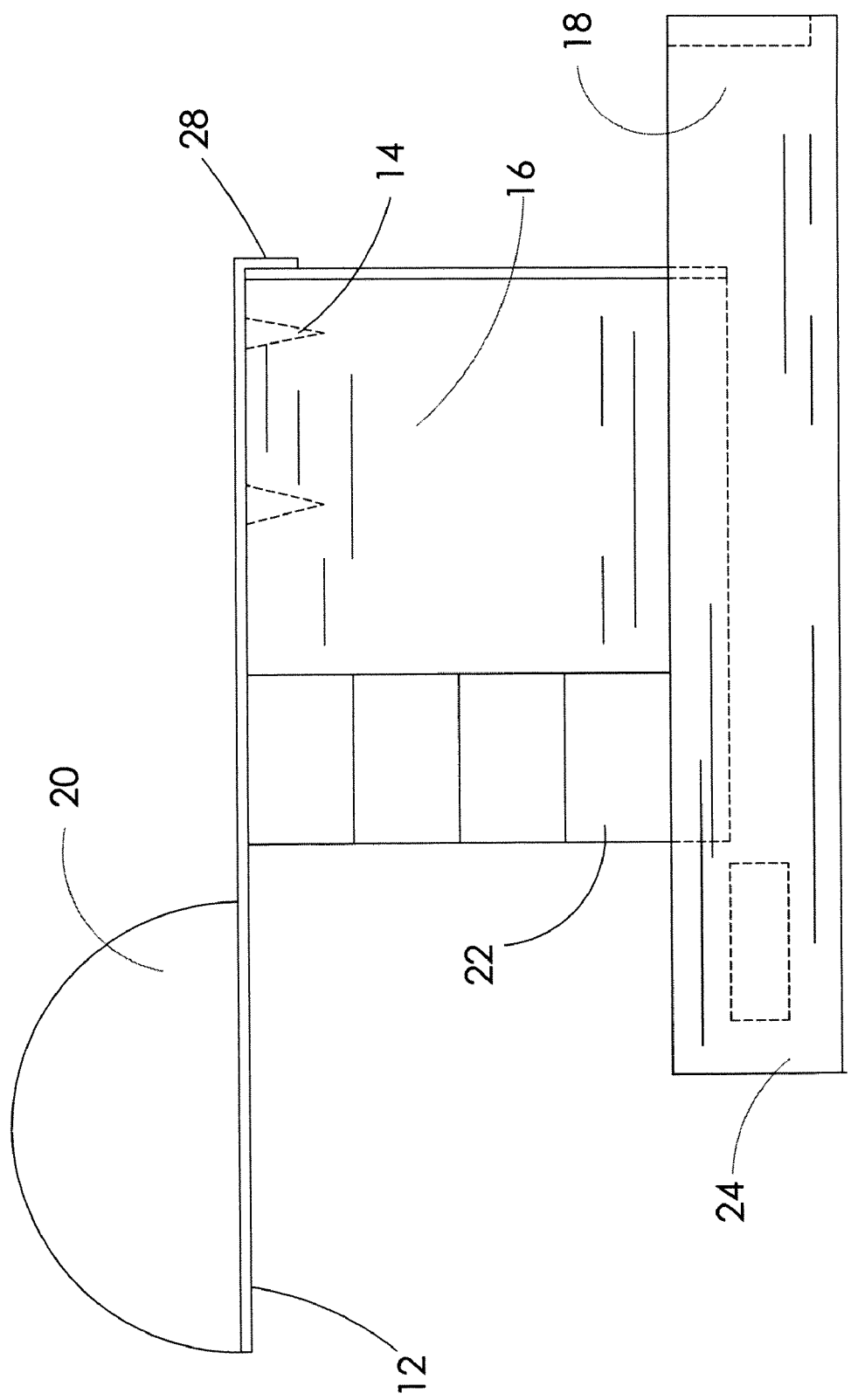
FIG. 1 is a front view of the device showing the device, an oil filter, and a draining rack.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 2:
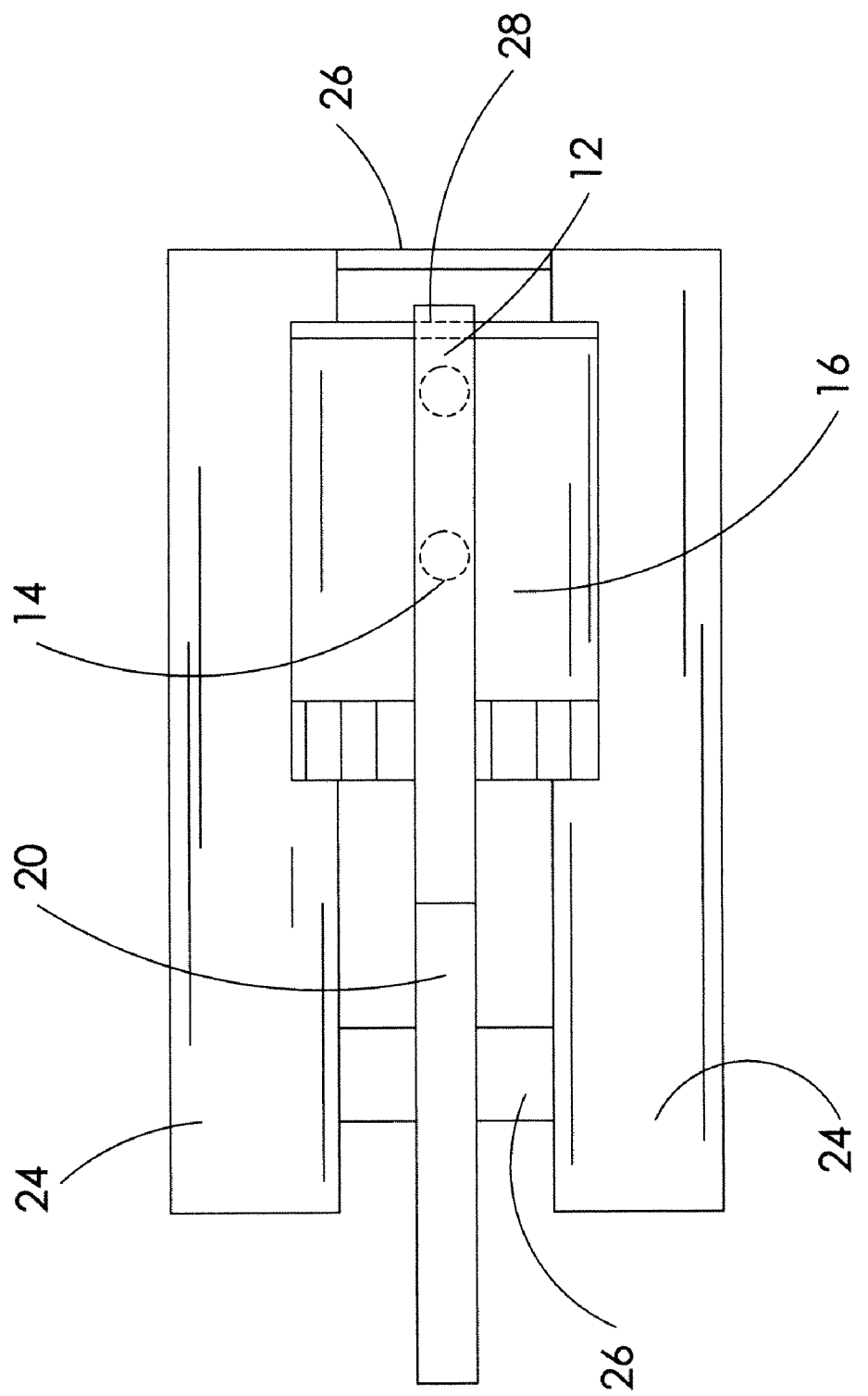
FIG. 2 is a top view showing the device, an oil filter, and a draining rack.

FIGS. 1-3 show several preferred embodiments of the invention. FIG. 1 shows an embodiment which includes a device body 12, a handle 20, two projecting spikes 14 and an end tab 28. These are collectively designated as 10 the oil filter draining device. Also shown is an oil filter 16 with a domed end of the filter designated as 22. The filter draining rack 18 of the invention as shown which includes two filter support bars 24 which are attached to each other with one or more cross pieces 26 which are shown in FIG. 2.

FIG. 2 is a top view of the oil filter draining device 10 of the invention in use. Shown is the filter draining rack 18 with two filter support bars 24 which are joined to each other by two cross pieces 26. Also shown is an oil filter 16, with an oil filter draining device 10 positioned along the side of the oil filter 16. In this position the end tab 28 would be positioned against the bottom rim of the oil filter 16, using the handle 20, and in this position the projecting spikes 14 will be correctly positioned to puncture two of the internal chambers of the oil filter. When the oil filter was then rotated so the puncture holes were facing downward, oil from the two punctured chambers of the oil filter would drain out and could be collected.

FIG. 3 shows a number of alternative configurations of the device. It is obvious that all of these configurations fall within the inventing concept of the device, and many other combinations are also possible. The device includes at least two projecting spikes 14, a handle which can take a number of configurations, and some configurations include an end tab, but that is not a mandatory feature of this device.

Certain of these configurations include three projecting teeth, which serve the purpose of guaranteeing that oil filters with three chambers for holding oil would be punctured thus will allow more complete draining of this type of filter.

SUMMARY OF THE INVENTION

In the following description and in the figures, like elements are identified with like reference numerals. The use of "or" indicates a non-exclusive alternative without limitation unless otherwise noted. The use of "including" means "including, but not limited to," unless otherwise noted.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. An oil filter draining device, for draining residual oil from a generally cylindrical oil filter with a closed end and an attachment end, said oil filter containing two or more internal chambers accessible from a filter sidewall, the device comprising:
 a device body with at least two projecting spikes, a first oil chamber spike and a second oil chamber spike, with said device body configured for placement on a side of said oil filter with at least one of said projecting spikes proximate the attachment end, and configured for being struck with an object such as a hammer so that said spikes puncture said side of said oil filter for drainage of oil from a first and a second side accessible internal chamber in said oil filter, with said device body including a handle for holding said device body against said oil filter for striking.

2. The oil filter draining device of claim 1 in which said handle extends parallel to the device body and is configured to extend past the closed end of the oil filter, to assist in holding the device in place against the oil filter side.

3. The oil filter draining device of claim 1 which further comprises an end tab configured for placement against said attachment end of said oil filter.

4. The oil filter draining device of claim 1 which further comprises three or more projecting spikes, for puncturing said oil filter.

5. The oil filter draining device of claim 1 which further comprises an oil filter draining rack comprising at least two oil filter support bars, spaced apart for supporting at least one oil filter in a horizontal position between said support bars for drainage of oil through a side of said at least one oil filter.

6. The oil filter draining device of claim 5 which further includes at least one cross piece for holding said oil filter support bars in a spaced apart relationship.

7. An oil filter draining device, for draining residual oil from a generally cylindrical oil filter with a closed end and an attachment end, containing two or more sidewall accessible internal oil chambers, the device comprising:
 a device body with at least two projecting spikes, a first oil chamber spike and a second oil chamber spike, with said device body configured for placement on a side of said oil filter with at least one of said projecting spikes proximate the attachment end, and configured for being struck with an object such as a hammer so that said spikes puncture said side of said oil filter for drainage of oil from a first and a second sidewall accessible oil chamber through the side of said oil filter, with said device body including a handle which extends parallel to the device body and is configured to extend past the closed end of the oil filter, to assist in holding the device in place against said oil filter for striking; and
 an end tab configured for placement against said attachment end of said oil filter.

8. An oil filter draining assembly for draining residual oil from a generally cylindrical oil filter with a closed end and an attachment end, containing two or more sidewall accessible internal oil chambers comprising:
 an oil filter draining device comprising a device body with at least two projecting spikes, a first oil chamber spike and a second oil chamber spike, with said device body configured for placement on a side of said oil filter with at least one of said projecting spikes proximate the attachment end, and configured for being struck with an object such as a hammer so that said spikes puncture said side of said oil filter for drainage of oil from the first and the second sidewall accessible internal oil chambers, with said device body including a handle which extends parallel to the device body and is configured to extend past the closed end of the oil filter, to assist in holding the device in place against said oil filter for striking;
 an end tab configured for placement against said attachment end of said oil filter;
 a filter draining rack with at least two oil filter support bars, spaced apart for supporting at least one oil filter between said oil filter support bars; and
 at least one cross piece for holding the support bars in a spaced apart relationship.

9. A method of draining residual oil from a two internal chambered oil filter, in which said oil filter is a generally cylindrical oil filter with a closed end and an attachment end, the method comprising:
 placing a device body with at least two projecting spikes, a first oil chamber spike and a second oil chamber spike, against a side of said oil filter with at least one of said projecting spikes proximate the attachment end;
 striking said device body with an object such as a hammer so that said spikes puncture said two internal chambers through said side of said oil filter for drainage; and
 placing said oil filters with said punctures facing down in a support rack for drainage of oil.

* * * * *